April 20, 1926.
H. B. ROSS
1,581,292
POWER TRANSMISSION MECHANISM
Filed April 8, 1925   2 Sheets-Sheet 2
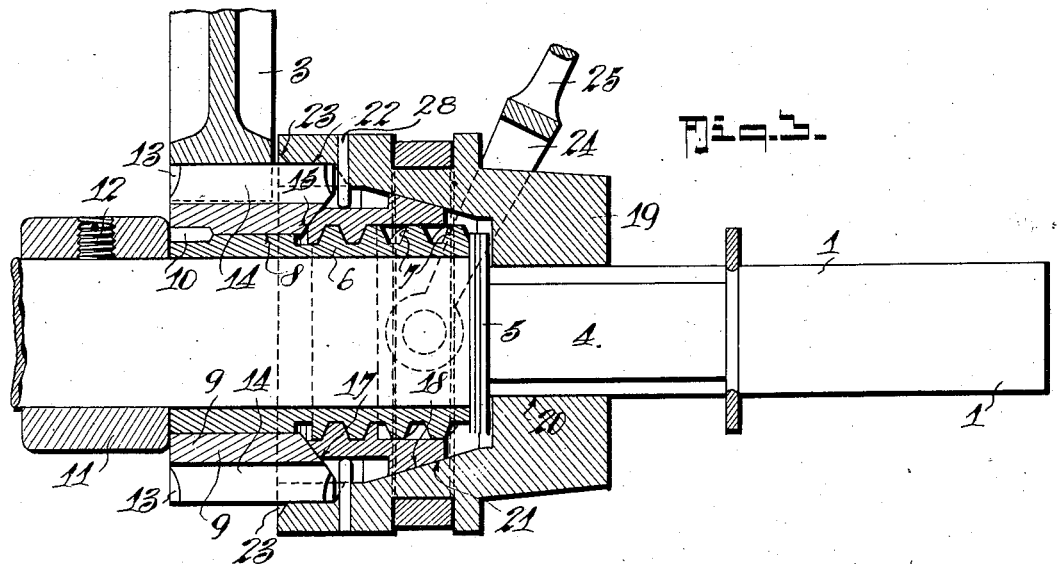
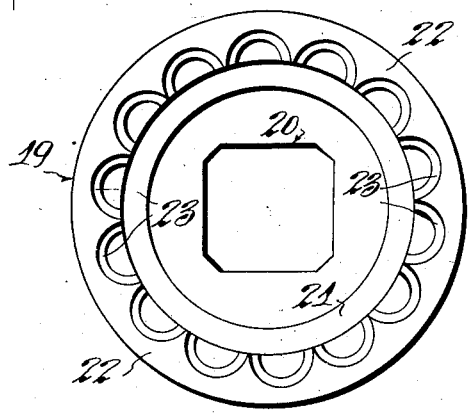
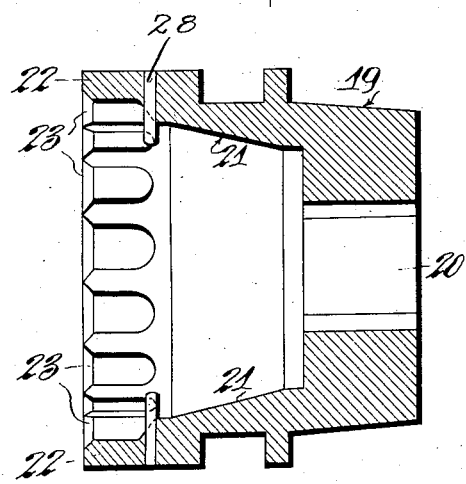
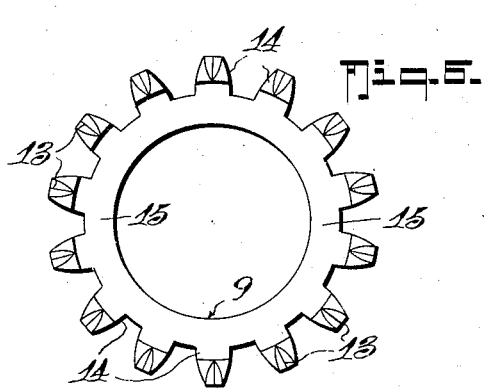
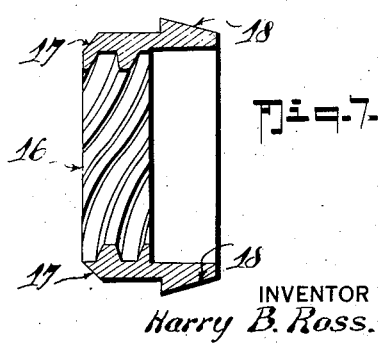
INVENTOR
*Harry B. Ross.*
BY
*Albert E. Dieterich*
ATTORNEY Patented Apr. 20, 1926.

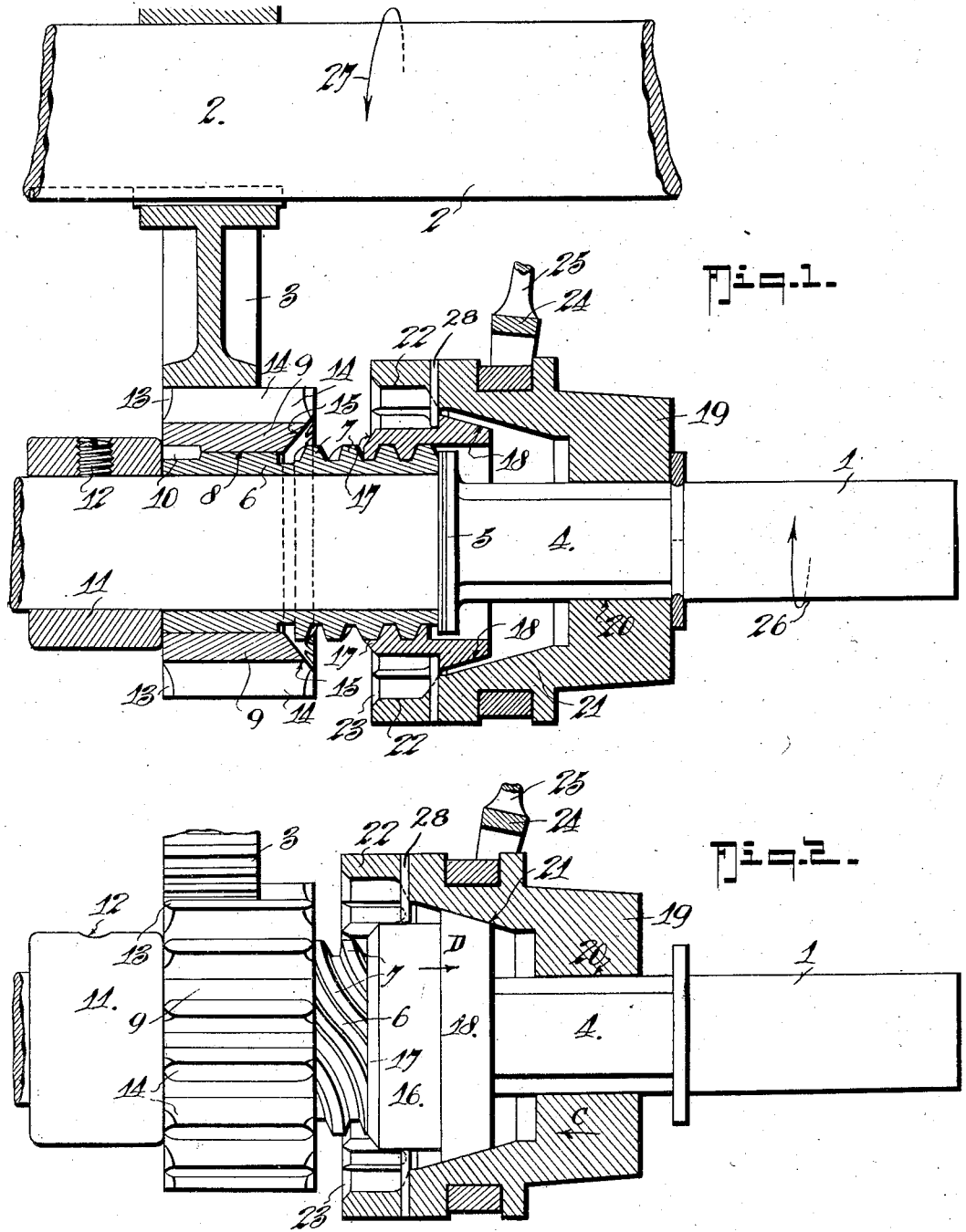

1,581,292

UNITED STATES PATENT OFFICE.

HARRY BEAUREGARD ROSS, OF DENVER, COLORADO.

POWER-TRANSMISSION MECHANISM.

Application filed April 8, 1925. Serial No. 21,639.

*To all whom it may concern:*

Be it known that I, HARRY B. Ross, a citizen of the United States, residing at Denver, in the county of Denver and State of Colorado, have invented certain new and useful Improvements in Power-Transmission Mechanism, of which the following is a specification.

My invention has for its objects to provide mechanism by means of which connections may be made between a driving and a driven shaft in such manner as to avoid gear clashing as is of such frequent occurrence in sliding gear transmissions; to provide a simple and inexpensive mechanism whereby the driving and driven shafts are brought to the same speed or approximately the same speed before the clutching teeth are meshed together; to provide a transmission mechanism embodying a driving and a driven shaft with permanently meshing gears, one of the gears being fixed to its shaft and the other being loosely mounted on its shaft, a sliding clutch on one of the shafts being adapted to be brought into and out of mesh with the loose gear, and mechanism being associated with the loose gear and the sliding clutch in such manner that the speeds of the driving and driven parts will be approximately equalized before the sliding clutch is meshed with the loose gear; and to provide means to effect and ensure the return of said associated mechanism to the neutral position when the sliding clutch is unmeshed from the loose gear.

In carrying out my invention I provide a sliding clutch with a female clutch face to interlock with the loose gear when brought brought into mesh and I also provide a worm-gear-friction clutch device acting between the loose gear and sliding clutch for retarding the meshing of the interlocking elements until the speed of the driving and driven parts have become approximately uniform, the worm-gear-friction clutch device being designed automatically to "throw out" i. e. to assume its normal position when the sliding clutch is withdrawn; I also provide a positively acting means to ensure the retention of the worm-gear-friction clutch element in its normal or disengaged position when the sliding clutch is in the withdrawn position.

In its more detailed nature the invention resides in those novel structures, combinations of parts and arrangements thereof, which will hereinafter be described, then be specifically pointed out in the appended claims, reference being had to the accompanying drawings, in which:—

Figure 1 is a vertical longitudinal section of a unit embodying my invention, the parts being in the neutral position.

Figure 2 is a similar view with the parts in the initially engaged position (the loose gear and worm and the worm-clutch element being shown in elevation in this figure).

Figure 3 is a view similar to Figures 1 and 2 with the clutch engaged with the loose gear, i. e. in the driving position.

Figure 4 is a vertical longitudinal section of the sliding clutch member.

Figure 5 is a face view of the same.

Figure 6 is a face view of the loose gear.

Figure 7 is a vertical longitudinal section of the gear-cone member.

In the drawings in which like numerals of reference designate like parts in all the figures 1 represents the driving shaft, 2 the driven shaft and 3 the spur gear fixed to the driven shaft.

The driving shaft 1 has a squared part 4 and is provided with a flange 5. 6 is a threaded gear-bushing, the threads 7 of which may be of any pitch or number but preferably sharply inclined, and the bushing 6 has bearing on the shaft 1 between the flange 5 and a collar 11 that is secured with a set screw 12 on said shaft 1. The bushing 6 has smooth gear receiving part 8 on which the loose clutch-gear 9 that meshes with the gear 3 is mounted and secured by a suitable pin or key 10. The loose clutch-gear 9 has teeth 14 whose ends are chamfered as at 13, and it is also provided with an internal bevel 15 to oppose a correspondingly bevelled face 17 of the internally threaded cone (the male clutch element). The cone 16 has a conical clutch face 18 to cooperate with the clutch face 21 of the shifting gear-clutch member 19 that has a squared opening 20 to fit on the squared part 4 of the shaft 1.

22 is the female clutch-gear face of the clutch member 19 which is adapted to receive the teeth of the loose clutch-gear 9 and it has chamfered faces 23 to permit an easy meshing of the parts when brought together.

24 is the shifting fork for moving the member 19 back and forth along the shaft 1 into and out of mesh, and 25 is the lever by which the fork 24 is operated.

26 is an arrow denoting the direction of the rotation of the driving shaft 1 and 27 is another arrow showing the direction of the driven shaft 2.

In operation, assume the parts to be positioned as indicated in Figure 1, as the driven shaft or as the loose gear and bushing are rotated at a greater speed than the speed of the driving shaft 1 and an attempt is made to shift the shiftable clutch element into mesh with the loose gear, the male and female clutch faces of the shiftable clutch element and the internally threaded clutch member 16 will be brought into engagement. As the perimetrical speed of the loose gear is greater than the speed of rotation of the driving shaft and as the threads of the bushing 6 are pitched so as to tend to throw the male clutch element 16 toward the end of the bushing opposite to the loose gear, a resistance will be encountered which will tend to slow down the speed of the loose gear and bushing until the speed of the loose gear and bushing and that of the driving shaft have become approximately equal, by which time the clutch faces 22 and 14 will come into mesh and lock the loose gear, the bushing and the male clutch element together to rotate at the same speed as a unit. The resistance above referred to is that of the co-operation of four separate and distinct forces taking place as follows: The forces indicated by the arrows C and D co-act to bind the shaft 1 to the gear 9, due to the internal friction between the surfaces 21 and 18 while at the same time rotative or stationary forces indicated by arrows 27 and 26 are in effect because of the inertia there at rest or in motion. Now if the gear 9 is turning faster than the shaft 1 and the surface 18 is in contact with the surface 21, clutch 16 will be dragged to the end of the threaded bushing 6 and in order that the element 22 shall engage the teeth of the gear 9 it is necessary that the frictional grip of the surface 21 on the surface 18 shall increase until the speed of shaft 1 is increased to that of the gear 9; then the binding action of the clutch element 16 on the threads 7 of the bushing 6 is relieved and element 22 can then be easily slid into full mesh with the teeth 14 of the gear 9. Since the force of rotation of the shaft 1 may be considered as a variable factor, and the force of rotation of the shaft 2 be considered fixed, it follows that element 21 can be shifted by the force applied in the direction of the arrow C to engage the toothed element 22 of the shiftable clutch 19 with the teeth of the gear 9. This is exactly what takes place in practice, because in a transmission gear set the shaft 1 is declutched from the engine when the force in the direction of the arrow C is to be applied to shift the clutch 19.

Under the condition where the shaft 1 is rotating faster than the shaft 2 there again the shaft 1 is the variable factor and rapidly slows down when it is declutched from the engine so that the former condition prevails at nearly all times. Now should the shaft 1 rotate faster than the gear 9 clutch surface 18 will still resist, at 21, the force applied in the direction of the arrow C as there will be a binding of element 16 on the threads of the bushing 6. This resistance will not be as great as in the other condition it is true, but again the shaft 1 is the variable factor and will yield its speed much more readily than accelerate due to the slight braking due to declutching the shaft 1 from the engine. Of course it is plain that either the stationary inertia of the shaft 2 when the automobile is still or the momentum of same transmitted back through the shaft 2 is many times more immobile than the loose free shaft 1 even when under the influence of said clutch brake. Now it will be apparent that when the rotative speed of the shaft 1 and gear 9 are nearly the same a very slight pressure in the direction of the arrow C will push element 16 up the inclinations of the threads of the bushing 6. So the binding of the internal threads of the element 16 on the threads of the bushing 6 will operate both ways. Straight keys could be used but since the first condition is prevalent, then by the use of threads that lead away from the direction of rotation, I am enabled to use very small conical friction surfaces and the device is thus more practical and economical. As the shifting clutch element is withdrawn to restore it to the neutral position the member 16 will be drawn forwardly again to its neutral or forward position.

In order to make certain the return of the member 16 to the neutral position I provide the female clutch element with pins 28 that engage the male clutch 16 and draw it forwardly in the event that it is not returned to the complete forward position automatically.

From the foregoing description, taken in connection with the accompanying drawing, it will be noticed that I have provided a system of constant meshing gearing with speed changing friction surfaces cooperating with steep lead screws or threads for the purpose of varying the speed of either the driving or driven member to approximately the speed of the other before rigidly coupling or positively coupling the driving and driven members together, and thus I am able to provide a power transmitting or speed changing mechanism in which functional meshing and unmeshing of gears is effected in a noiseless manner and without danger of stripping the threads.

It is also thought that from the foregoing description, taken in connection with the accompanying drawing, the complete construction, operation and advantages of my invention will be clear to those skilled in the art.

What I claim is:

1. In power transmitting mechanism wherein is provided a driving shaft and a driven shaft, meshed gears connecting said shafts, one of said gears being fixed to its shaft and the other being loosely mounted on its shaft; a threaded bushing turning with said loose gear, an internally threaded male clutch element mounted on said bushing, a shiftable female clutch-gear member mounted on the shaft which carries the bushing to cooperate with said male clutch element and with said loose gear, and means to shift said shiftable clutch-gear member, the threads of said bushing and of said male clutch element being pitched to cause resistance and contact between the clutch faces of said male and female elements to bring the speed of rotation of the driving and driven elements to approximately the same amount before the female clutch-element engages the cooperating part of the loose gear.

2. In power transmitting mechanism wherein is provided a driving shaft and a driven shaft, meshed gears on said shafts, one being fixed and the other loose; a shiftable clutch member having toothed recesses to receive the teeth of said loose gear when moved into engagement therewith, means including a floating male clutch element associated with said loose gear and with a clutch face on said shiftable clutch element to bring said shiftable clutch element and loose gear to approximately the same speed of rotation before engaging the clutch element and gear.

3. In power transmitting mechanism wherein is provided a driving shaft and a driven shaft, meshed gears on said shafts, one being fixed and the other loose; a shiftable clutch element having toothed recesses to receive the teeth of said loose gear when moved into engagement therewith, means associated with said clutch element and with said loose gear to bring them to approximately the same speed of rotation before engaging the clutch element and gear, said means including friction surfaces cooperating with a steep lead screw.

4. In power transmitting mechanism wherein is provided a driving shaft and a driven shaft, meshed gears on said shafts, one being fixed and the other loose; a shiftable clutch element having toothed recesses to receive the teeth of said loose gear when moved into engagement therewith, means associated with said clutch element and with said loose gear to bring them to approximately the same speed of rotation before engaging the clutch element and gear, said means including a threaded bushing rotated with and secured to said loose gear, a male clutch element loosely threaded on said bushing, said shiftable clutch element having a female part to cooperate with said male element.

5. In power transmitting mechanism wherein is provided a driving shaft and a driven shaft, meshed gears on said shafts, one being fixed and the other loose; a shiftable clutch element having toothed recesses to receive the teeth of said loose gear when moved into engagement therewith, means associated with said clutch element and with said loose gear to bring them to approximately the same speed of rotation before engaging the clutch element and gear, said means including a threaded bushing rotated with and secured to said loose gear, a male clutch element loosely threaded on said bushing, said shiftable clutch element having a female part to cooperate with said male clutch element, and means to ensure the engagement of said male clutch element with said female part before said shiftable clutch element is meshed with said loose gear.

6. In power transmitting mechanism wherein is provided a driving shaft and a driven shaft, meshed gears on said shafts, one being fixed and the other loose; a shiftable clutch element having toothed recesses to receive the teeth of said loose gear when moved into engagement therewith, means associated with said clutch element and with said loose gear to bring them to approximately the same speed of rotation before engaging the clutch element and gear, said means including a threaded bushing rotated with and secured to said loose gear, a male clutch element loosely threaded on said bushing, said shiftable clutch element having a female part to cooperate with said male clutch element, and means to ensure the engagement of said male clutch element with said female part before said shiftable clutch element is meshed with said loose gear, said ensuring means including fingers on the shiftable clutch element to move said male clutch element to the neutral position when said shiftable clutch element is being withdrawn.

7. In power transmitting mechanism wherein is provided a driving shaft and a driven shaft, meshed gears on said shafts, one being fixed and the other loose; a shiftable clutch element having toothed recesses to receive the teeth of said loose gear when moved into engagement therewith, means associated with said clutch element and with said loose gear to bring them to approximately the same speed of rotation before engaging the clutch element and gear, said means including a sharply inclined spiral secured to rotate with said loose gear and inclined to lead from the direction of rotation thereof, a shiftable male clutch element on said spiral, said first mentioned shiftable clutch element having a part to cooperate with said male clutch element in advance of the meshing of the shiftable clutch element with the loose gear.

HARRY BEAUREGARD ROSS.